Patented Jan. 27, 1925.

1,524,113

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

PROCESS FOR OBTAINING SODIUM FERROUS FERROCYANIDE.

Drawing. Application filed January 27, 1921, Serial No. 440,533. Renewed June 18, 1924.

*To all whom it may concern:*

Be it known that I, FREDERICK W. SPERR, Jr., a citizen of the United States, residing in Pittsburgh, in the county of Allegheny and State of Pennsylvania, have invented a new and useful Improvement in Processes for Obtaining Sodium Ferrous Ferrocyanide, of which the following is a specification.

This invention relates to the treatment of fuel gases, such for example as coke oven gas, retort coal gas, and other gases containing cyanogen bearing compounds. The invention has for an object to effect an efficient recovery of the cyanogen bearing compounds from such gases by the provision of a process in which the absorbent agent for use in the recovery of the cyanogen is prepared with great economy, the preparation of the absorbent agent resulting in the formation of compounds which may be readily converted into compounds used as the vehicle for bringing the absorbent agent into contact with the gases, or applied to other industrial uses.

The present invention is of particular utility in connection with the known processes for effecting the recovery of cyanogen bearing compounds from heating and illuminating gases by means of sodium ferrous ferrocyanide suspended in a solution of sodium carbonate, the sodium ferrous ferrocyanide effecting the recovery of the cyanogen bearing compounds in the form of hydrocyanic acid and the formation of further ferrocyanide, which may be subsequently decomposed into ferrous ferrocyanide and hydrocyanic acid. For convenience, the present description will be confined to this particular use of the invention; the novel features and improvements made by the invention, are susceptible of other applications, hence, the scope of the invention is not confined to the specific use and specific embodiment herein described.

In effecting the recovery of cyanogen bearing compounds from gases, sodium ferrous ferrocyanide, a relatively insoluble compound, is suspended in a solution of sodium carbonate and brought into contact with the gas which contains hydrogen sulphide and hydrocyanic acid. The following reactions then occur:

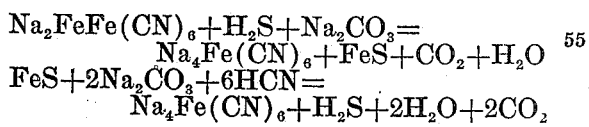

The hydrocyanic acid formed according to the above equation is recovered and the sodium ferrocyanide ($Na_4Fe(CN)_6$), may be decomposed to form further sodium ferrous ferrocyanide ($Na_2FeFe(CN)_6$), which is used in conjunction with sodium carbonate to absorb further quantities of hydrocyanic acid from the gas.

In accordance with the invention, nitre cake (sodium bisulphate—$NaHSO_4$) is employed for effecting the decomposition of the sodium ferrocyanide. When a solution of nitre cake is brought into contact with sodium ferrocyanide, the following reaction results:

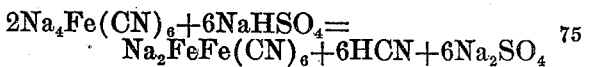

The sodium ferrous ferrocyanide produced according to the above reaction is employed for the absorption of cyanogen compounds from the gas in the manner hereinbefore described, and the hydrocyanic acid is recovered and utilized industrially as desired. The relatively large quantity of sodium sulphate ($Na_2SO_4$) formed may be converted by means of the well-known Le Blanc process into sodium carbonate. This affords an amply sufficient quantity of sodium carbonate for employment as the vehicle in connection with the sodium ferrous ferrocyanide for treatment of the gas. In fact approximately forty to forty-four per cent of the sodium carbonate produced will be sufficient for the gas treatment. A further proportion of the sodium carbonate, namely from about forty-two to forty-three per cent of the total may be causticized with lime producing sodium hydroxide which is used to absorb the hydrocyanic acid evolved from the decomposition of the sodium ferrous ferrocyanide, in case it is desired to manufacture sodium cyanide. There is thus available for other uses a surplus of sodium carbonate amounting to from fifteen to seventeen per cent of the total quantity produced from the sodium sulphate. Consequently, by the employment of nitre cake for decomposing the sodium ferrocyanide, the process is made practically self-contained, since there is thereby furnished all the sodium carbonate and sodium hydroxide necessary to carry on the cyanide recovery process, with a surplus of sodium carbonate available for other uses.

The above invention is, for example, also applicable in connection with processes in which potassium ferrocyanide ($K_4Fe(CN)_6$) is produced and decomposed instead of sodium ferrocyanide, the reactions proceeding in analogous manner. In such cases potassium bisulphate ($KHSO_4$) may be substituted for the nitre cake in the decomposition of the potassium ferrocyanide.

The invention as herein above set forth may be variously embodied within the scope of the claims hereinafter made.

I claim:

1. The process for obtaining sodium ferrous ferrocyanide which consists in decomposing sodium ferrocyanide with sodium bisulphate for the formation of hydrocyanic acid, sodium ferrous ferrocyanide and sodium sulphate; substantially as specified.

2. The process for obtaining an alkali metal ferrous ferrocyanide which consists in decomposing an alkali metal ferrocyanide with an alkali metal bisulphate for the formation of hydrocyanic acid, alkali metal ferrous ferrocyanide and alkali metal sulphate; substantially as specified.

FREDERICK W. SPERR, Jr.